US007382924B2

(12) United States Patent
Hatti et al.

(10) Patent No.: US 7,382,924 B2
(45) Date of Patent: Jun. 3, 2008

(54) PIXEL REORDERING AND SELECTION LOGIC

(75) Inventors: Mallinath Hatti, Bangalore (IN); Lakshmanan Ramakrishnan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 766 days.

(21) Appl. No.: 10/712,482

(22) Filed: Nov. 13, 2003

(65) Prior Publication Data

US 2005/0036696 A1 Feb. 17, 2005

Related U.S. Application Data

(60) Provisional application No. 60/495,695, filed on Aug. 14, 2003.

(51) Int. Cl.
*G06K 9/36* (2006.01)
*G06T 9/00* (2006.01)
*H04B 1/66* (2006.01)

(52) U.S. Cl. ...................... 382/233; 382/235; 345/555; 375/240.01

(58) Field of Classification Search ................ 382/233; 345/555; 375/240.01-240.29
See application file for complete search history.

(56) References Cited

U.S. PATENT DOCUMENTS 5,269,003 A * 12/1993 Roskowski et al. ......... 345/566
5,570,088 A * 10/1996 Rhodes ........................ 341/50
5,640,545 A * 6/1997 Baden et al. ............... 345/545
5,777,601 A * 7/1998 Baker et al. ................ 345/603
5,798,753 A * 8/1998 Zhou et al. ................. 345/603
5,838,955 A * 11/1998 Childers et al. ............ 710/113
6,040,868 A * 3/2000 Jun ............................ 348/448
6,091,431 A * 7/2000 Saxena et al. .............. 345/535
6,501,507 B1 * 12/2002 Canfield ..................... 348/441
6,594,315 B1 * 7/2003 Schultz et al. ......... 375/240.25
6,636,222 B1 * 10/2003 Valmiki et al. ............. 345/505
6,927,776 B2 * 8/2005 Mino et al. ................. 345/538
2003/0021346 A1 * 1/2003 Bixby et al. ........... 375/240.25

* cited by examiner

*Primary Examiner*—Jingge Wu
*Assistant Examiner*—José M Torres
(74) *Attorney, Agent, or Firm*—McAndrews Held & Malloy Ltd.

(57) ABSTRACT

Presented herein are systems and methods for pixel reordering and selection. A decoded frame is stored in a frame buffer with a particular pixel order and byte order. A pixel feeder fetches portions of the decoded frame and stores portions of the frame in a double buffer with the same pixel order and byte order. An endian swizzle converts the byte ordering to a predetermined format, as needed. Reordering logic changes the pixel order to a predetermined order. Selection logic selects luma and chroma pixels from fetched pixels and provides the luma pixels to a luma pixel register, chroma Cr pixels to a chroma Cr pixel register, and chroma Cb pixels to a chroma Cb pixel register.

16 Claims, 8 Drawing Sheets

| | | | | | | | | | |
|---|---|---|---|---|---|---|---|---|---|
| 100(0) | $Y_0Cr_0Cb_0$ | $Y_1$ | $Y_2Cr_1Cb_1$ | $Y_3$ | $Y_4Cr_2Cb_2$ | $Y_5$ | ... | $Y_{x-1}Cr_{(x-1)/2}Cb_{(x-1)/2}$ | $Y_x$ |
| 100(1) | $Y_0Cr_0Cb_0$ | $Y_1$ | $Y_2Cr_1Cb_1$ | $Y_3$ | $Y_4Cr_2Cb_2$ | $Y_5$ | ... | $Y_{x-1}Cr_{(x-1)/2}Cb_{(x-1)/2}$ | $Y_x$ |
| 100(2) | $Y_0Cr_0Cb_0$ | $Y_1$ | $Y_2Cr_1Cb_1$ | $Y_3$ | $Y_4Cr_2Cb_2$ | $Y_5$ | ... | $Y_{x-1}Cr_{(x-1)/2}Cb_{(x-1)/2}$ | $Y_x$ |
| 100(3) | $Y_0Cr_0Cb_0$ | $Y_1$ | $Y_2Cr_1Cb_1$ | $Y_3$ | $Y_4Cr_2Cb_2$ | $Y_5$ | ... | $Y_{x-1}Cr_{(x-1)/2}Cb_{(x-1)/2}$ | $Y_x$ |
| | : | | | | | | | | |
| 100(N) | $Y_0Cr_0Cb_0$ | $Y_1$ | $Y_2Cr_1Cb_1$ | $Y_3$ | $Y_4Cr_2Cb_2$ | $Y_5$ | ... | $Y_{x-1}Cr_{(x-1)/2}Cb_{(x-1)/2}$ | $Y_x$ |

FIGURE 2

| | |
|---|---|
| 48Y(0) | $Y_0, Y_1, Y_2$..........................$Y_{15}$ |
| 48Y(1) | $Y_{16}, Y_{17}, Y_{18}$........................$Y_{31}$ |
| : | |
| 48Y(i) | $Y_{16i}, Y_{16i+1}, Y_{16i+2}$....................$Y_{16i+15}$ |
| : | |

48Y

| | |
|---|---|
| 48C(0) | $Cr_0\ Cb_0, Cr_1\ Cb_1,$ .................... $Cr_7\ Cb_7$ |
| 48C(1) | $Cr_8\ Cb_8, Cr_9\ Cb_9,$ ......................$Cr_{15}\ Cb_{15}$ |
| : | |
| 48C(i) | $Cr_{8i}\ Cb_{8i}, Cr_{8i+1}\ Cb_{8i+1},$ ........... $Cr_{8i+7}\ Cb_{8i+7}$ |
| : | |

48C

FIGURE 3A $U_i$ => $Y_{2i}Cr_iCb_i$ $Y_{2i+1}$

| | |
|---|---|
| 48(0) | $U_0, U_1, U_2, U_3$ |
| 48(1) | $U_4, U_5, U_6, U_7$ |
| 48(2) | $U_8, U_9, U_{10}, U_{11}$ |
| : | |
| 48(i) | $U_{4i}, U_{4i+1}, U_{4i+2}, U_{4i+3}$ |

FIGURE 3B

| | |
|---|---|
| 48Y(0) | $Y_0, Y_1, Y_2 \ldots\ldots Y_{15}$ |
| 48Y(1) | $Y_{16}, Y_{17}, Y_{18} \ldots\ldots Y_{31}$ |
| : | |
| 48Y(i) | $Y_{16i}, Y_{16i+1}, Y_{16i+2} \ldots\ldots Y_{16i+15}$ |
| : | |

48Y

| | |
|---|---|
| 48R(0) | Cr, Cr, .................... Cr |
| : | |
| 48R(i) | Cr, Cr, .................... Cr |
| : | |

48CR

| | |
|---|---|
| 48R(0) | Cr, Cr, .................... Cr |
| : | |
| 48R(i) | Cr, Cr, .................... Cr |
| : | |

48CB

FIGURE 3C

| $b_{0..7}$ | $b_{8..15}$ | $B_{16..23}$ | $b_{24..31}$ | $b_{32..39}$ | $b_{40..47}$ | $b_{48..55}$ | $b_{56..63}$ | $b_{64..71}$ | $b_{72..79}$ | $b_{80..87}$ | $b_{88..95}$ | $b_{96..103}$ | $b_{104..111}$ | $b_{112..119}$ | $b_{120..127}$ |
|---|---|---|---|---|---|---|---|---|---|---|---|---|---|---|---|
| Cb | $Y_0$ | Cr | $Y_1$ | Cb | $Y_0$ | Cr | $Y_1$ | Cb | $Y_0$ | Cr | $Y_1$ | Cb | $Y_0$ | Cr | $Y_1$ |
| $U_{4i}$ | | | | $U_{4i+1}$ | | | | $U_{4i+2}$ | | | | $U_{4i+3}$ | | | |

FIGURE 4A

| $b_{127...120}$ | $b_{119...112}$ | $b_{111...104}$ | $b_{103...96}$ | $b_{95...88}$ | $b_{87...80}$ | $b_{79...72}$ | $b_{71...64}$ | $b_{63...56}$ | $b_{55...48}$ | $b_{47...40}$ | $b_{39...32}$ | $b_{31...24}$ | $b_{23...16}$ | $b_{15...8}$ | $b_{7...0}$ |
|---|---|---|---|---|---|---|---|---|---|---|---|---|---|---|---|
| Cb | $Y_0$ | Cr | $Y_1$ | Cb | $Y_0$ | Cr | $Y_1$ | Cb | $Y_0$ | Cr | $Y_1$ | Cb | $Y_0$ | Cr | $Y_1$ |
| $U_{4i}$ | | | | $U_{4i+1}$ | | | | $U_{4i+2}$ | | | | $U_{4i+3}$ | | | |

FIGURE 4B

| $b_{0...7}$ | $b_{8...15}$ | $b_{16...23}$ | $b_{24...31}$ | $b_{32...39}$ | $b_{40...47}$ | $b_{48...55}$ | $b_{56...63}$ | $b_{64...71}$ | $b_{72...79}$ | $b_{80...87}$ | $b_{88...95}$ | $b_{96...103}$ | $b_{104...111}$ | $b_{112...119}$ | $b_{120...127}$ |
|---|---|---|---|---|---|---|---|---|---|---|---|---|---|---|---|
| $Y_{16i}$ | $Y_{16i+1}$ | $Y_{16i+2}$ | $Y_{16i+3}$ | $Y_{16i+4}$ | $Y_{16i+5}$ | $Y_{16i+6}$ | $Y_{16i+7}$ | $Y_{16i+8}$ | $Y_{16i+9}$ | $Y_{16i+10}$ | $Y_{16i+11}$ | $Y_{16i+12}$ | $Y_{16i+13}$ | $Y_{16i+14}$ | $Y_{16i+15}$ |
| $U_{4i}$ | | | | $U_{4i+1}$ | | | | $U_{4i+2}$ | | | | $U_{4i+3}$ | | | |

FIGURE 5

FIG. 6
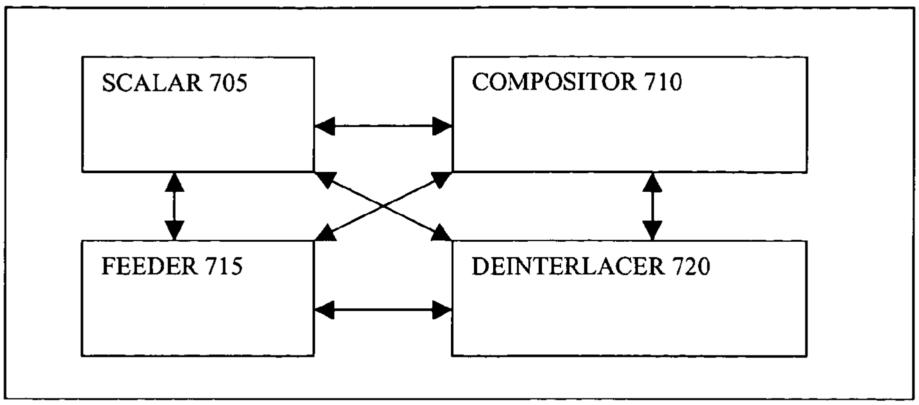
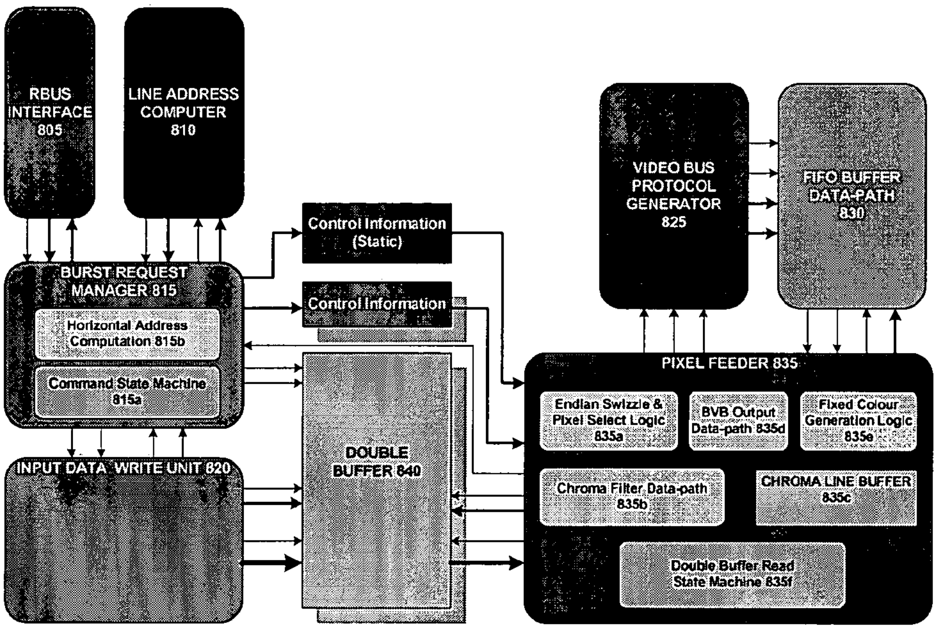
FIGURE 7

Endian Swizzle 835a(1)

PIXEL REORDERING AND SELECTION LOGIC

RELATED APPLICATIONS

This application is also related to the following U.S. patent applications, each of which are incorporated herein by reference: "Line Address Computer for Decoding the Line Addresses of Decoded Video Data", U.S. patent application Ser. No. 10/703,332, filed Nov. 7, 2003 by Hatti. et. al., and claiming priority to Provisional Application for Patent Ser. No. 60/495,695 filed Aug. 14, 20003. "Line Address Computer for Providing Coefficients to Chroma Filter", U.S. patent application Ser. No. 10/712,638, filed Nov. 13, 2003 by Hatti, and claiming priority to Provisional Application for Patent Ser. No. 60/495,695. "Line Address Computer for Providing Line Addresses in Multiple Contexts", U.S. patent application Ser. No. 10/714,833, filed Nov. 14. 2003 by Hatti. and claiming priority to Provisional Application for Patent Ser. No. 60/495,695.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A video decoder receives encoded video data and decodes and/or decompresses the video data. The decoded video data comprises a series of pictures. A display device displays the pictures. The pictures comprise a two-dimensional grid of pixels. The display device displays the pixels of each frame in real time at a constant rate. In contrast, the rate of decoding can vary considerably for different video data. Accordingly, the video decoder writes the decoded pictures in a frame buffer.

Among other things, a display engine is synchronized with the display device and provides the appropriate pixels to the display device for display. The display engine provides the appropriate pixels from the frame buffer to the display device. The location of the appropriate pixels in the frame buffer is dependent on the manner that the video decoder writes the pictures to the frame buffer.

Characteristics that characterize the manner that the video decoder writes the picture to the frame buffer include the packing of luma and chroma pixels, the linearity that the frame is stored, and the spatial relationship between the luma and chroma pixels. The foregoing characteristics are usually determined by the original format of the source video data.

The luma and chroma pixels of a picture can either be stored together or separately. The chroma pixels include chroma red difference pixels Cr, and chroma blue difference pixels Cb. In macroblock format, the luma Y pixels are stored in one array, while both chroma pixels Cr/Cb are stored together in another array. In planar format, the luma pixels Y are stored in one array, the chroma Cr pixels are stored in a second array, and the chroma Cb pixels are stored in a third array. In packed YUV format, the luma pixels and both the chroma Cr/Cb pixels are stored together in a single array.

In the packed YUV format, each alternating luma Y pixel is co-located with chroma pixels Cr&Cb in horizontal direction. A picture in the packed YUV format can be divided into units of four pixels, each of the units capable of being stored in a 32-bit word. The four pixels comprise adjacent luma Y pixels and the chroma pixels Cr/Cb co-located with one of the luma Y pixels. The luma Y pixels and the chroma pixels Cr/Cb can be packed in any one of several pixel orders. Examples of pixel orders that the luma Y pixels and chroma pixels Cr/Cb can be packed include, $Cb_0/Y_0/Cr_0/Y_1$, $Cr_0/Y_0/Cb_0/Y_1$, $Y_0/Cb_0/Y_1/Cr_0$, and $Y_0/Cr_0/Y_1/Cb_0$. Additionally, in big endian order, the four bytes are stored in a 32-bit dword as byte0/byte1/byte2/byte3. In little endian order, the four bytes are stored as byte3/byte2/byte1/byte0. Whether bytes are stored in big endian byte order or little endian byte order depends on the hardware characteristics of the frame buffer memory.

The video decoder does not necessarily store the picture in a linear manner. In planar and packed YUV formats, the video decoder stores pictures in linear format i.e., left to right and top to bottom order in the memory. However, in MPEG, DV25, and TM5, pictures are stored in the frame buffer in a macroblock format. In the macroblock format, the pixels of the picture are divided into two dimensional blocks. The video decoder stores the two dimensional blocks in consecutive memory locations.

Additionally, the spatial relationship of chroma pixels to luma pixels can differ among the many standards. Standards defining the spatial relationship of the chroma pixels to luma pixels include MPEG 4:2:0, MPEG 4:2:2, DV-25 4:2:0, and DV-25 4:1:1 to name a few. Where the standards for the display and the decoded video data differ, chroma pixels for the display can be interpolated from two or more chroma pixels in the decoded video data. The standard for the decoded video data is heavily dependent on the format of the source video data.

Conventionally, after each horizontal synchronization pulse, the host processor calculates the address of the first pixels of a line and the parameters for chroma format conversion. The host processor then programs the display engine with the foregoing.

Programming the display engine at each horizontal synchronization pulse consumes considerable bandwidth from the host processor.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

Presented herein is a line address computer for calculating the line addresses of decoded video data.

In one embodiment, there is presented a method for displaying pictures. The method comprises fetching a portion of a picture stored in a frame buffer, the portion of the picture stored with a byte order, storing the portion of the picture in another buffer with the byte order, fetching a plurality of pixels from the portion of the picture, and converting the byte order of the plurality of pixels to a predetermined byte order, wherein the byte order is different from the predetermined byte order.

In another embodiment, there is presented a system for displaying pictures. The system comprises a first circuit, a buffer, a state machine, and a second circuit. The first circuit fetches a portion of a picture stored in a frame buffer, the portion of the picture stored with a byte order. The buffer stores the portion of the picture with the byte order. The state machine fetches a plurality of pixels from the portion of the picture. The second circuit converts the byte order of the plurality of pixels to a predetermined byte order, wherein the byte order is different from the predetermined byte order.

In another embodiment, there is presented a method for displaying pictures. The method comprises fetching a portion of a picture stored in a frame buffer, the portion of the picture stored with a pixel order, storing the portion of the picture in another buffer with the pixel order, fetching a plurality of pixels from the portion of the picture, converting the pixel order of the plurality of pixels to a predetermined pixel order.

In another embodiment, there is presented a system for displaying pictures. The system comprises a first circuit, a buffer, an input data write unit, and a second circuit. The first circuit fetches a portion of a picture stored in a frame buffer, the portion of the picture stored with a pixel order. The buffer stores the portion of the picture with the pixel order. The input data write unit fetches a plurality of pixels from the portion of the picture. The second circuit converts the pixel order of the plurality of pixels to a predetermined pixel order.

In another embodiment, there is presented a method for displaying pictures. The method comprises fetching a portion of a picture stored in a frame buffer, storing the portion of the picture in another buffer, fetching a plurality of pixels from the portion of the picture, storing luma pixels in a luma pixel register, wherein the plurality of pixels comprise luma pixels, and storing chroma pixels in a chroma pixel register, wherein the plurality of pixels comprise chroma pixels.

In another embodiment, there is presented a system for displaying pictures. The system comprises a first circuit, a buffer, a state machine, a luma pixel register, and a chroma pixel register. The first circuit fetches a portion of a picture stored in a frame buffer. The buffer stores the portion of the picture. The state machine fetches a plurality of pixels from the portion of the picture. The luma pixel register stores luma pixels, wherein the plurality of pixels comprise luma pixels. The chroma pixel register stores chroma pixels, wherein the plurality of pixels comprise chroma pixels.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is a block diagram of an exemplary frame;

FIG. 3A is a block diagram of a frame buffer storing a frame in accordance with the MPEG, DV25 and TM5 formats;

FIG. 3B is a block diagram of a frame buffer storing a frame in accordance with the packed YUV format;

FIG. 3C is a block diagram of a frame buffer storing a frame in accordance with the planar format;

FIG. 4A is a block diagram of an exemplary gword storing packed YUV data in the big endian byte order;

FIG. 4B is a block diagram of an exemplary gword storing packed YUV data in the little endian byte order;

FIG. 5 is a block diagram of an exemplary gword storing MPEG/DV-25/TM5 pixels in the big endian byte order;

FIG. 6 is a block diagram of an exemplary display engine in accordance with an embodiment of the present invention;

FIG. 7 is a block diagram of a pixel feeder in accordance with an embodiment of the present invention;

DETAILED DESCRIPTION OF THE INVENTION

Figure 1:
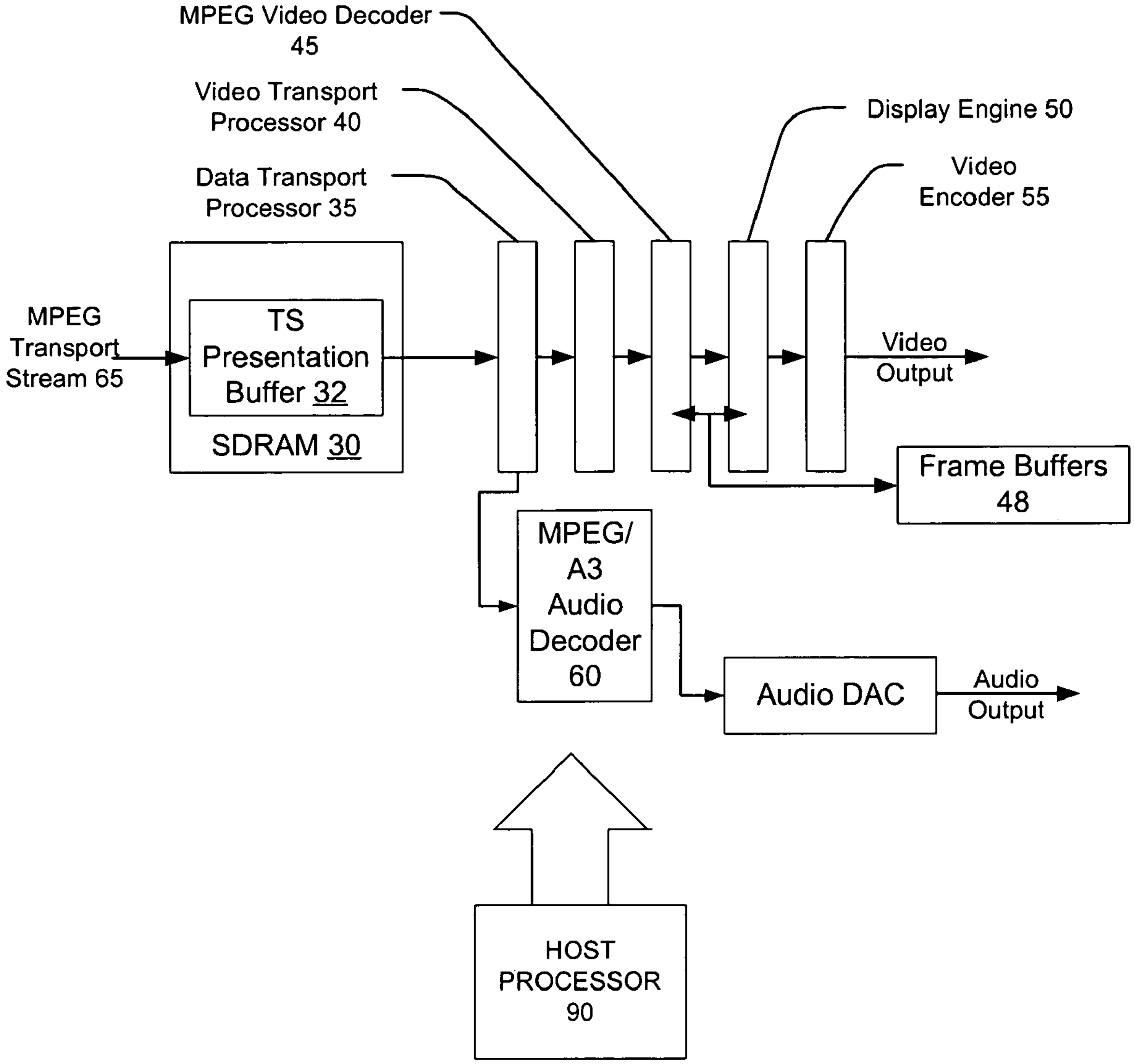
FIG. 1 is block diagram of an exemplary decoder system in accordance with an embodiment of the present invention.

Referring now to FIG. 1, there is illustrated a block diagram of an exemplary decoder system for decoding compressed video data, configured in accordance with an embodiment of the present invention. A processor, that may include a CPU 90, reads transport stream 65 into a transport stream buffer 32 within an SDRAM 30.

The data is output from the transport stream buffer 32 and is then passed to a data transport processor 35. The data transport processor 35 then demultiplexes the transport stream 65 into constituent transport streams. The constituent packetized elementary stream can include for example, video transport streams, and audio transport streams. The data transport processor 35 passes an audio transport stream to an audio decoder 60 and a video transport stream to a video transport processor 40.

The video transport processor 40 converts the video transport stream into a video elementary stream and provides the video elementary stream to a video decoder 45. The video decoder 45 decodes the video elementary stream, resulting in a sequence of decoded video frames. The decoding can include decompressing the video elementary stream. It is noted that there are various standards for compressing the amount of data required for transportation and storage of video data, such as MPEG-2.

The decoded video data includes a series of frames. The frames are stored in a frame buffer 48. The frame buffer 48 can be dynamic random access memory (DRAM) comprising 128 bit/16 byte gigantic words (gwords). It is also noted that in certain standards, such as MPEG-2, the order that frames are decoded is not necessarily the order that frames are presented. Accordingly, several pictures can be stored in the frame buffer 48 at a given time.

The display engine 50 is responsible for providing a bitstream to a display device, such as a monitor or a television. A display device displays the pictures in a specific predetermined display format with highly synchronized timing. The format dictates the order that different portions of a picture are displayed, as well as the positions of pixels.

Referring now to FIG. 2, there is illustrated a block diagram describing an exemplary picture 100. The picture 100 comprises any number of horizontal rows 100(0) . . . 100(N). Each row 100(0) . . . 100(N) includes a row of luma Y pixels, $Y_0 \ldots Y_x$, and half as many chroma Cr pixels $Cr_0 \ldots Cr_{(x-1)/2}$ and half as many chroma Cb pixels $Cb_0 \ldots Cb_{(x-1)/2}$. In a standard definition television picture 100, there are 480 rows (N=479), each comprising 720 luma Y pixels, 360 chroma Cr pixels, and 360 chroma Cb pixels.

The luma Y, chroma Cr, and chroma Cb pixels can be stored in one of several array formats. For example, in the packed YUV format, the luma Y, chroma Cr, and chroma Cb pixels are stored together in one array in linear format. In the planar format, the luma pixels, chroma Cr pixels, and chroma Cb pixels are each stored in separate arrays in linear format. In MPEG, DV25, and TM5, the luma pixels Y are stored in one array, while the chroma Cr and chroma Cb pixels are stored together in another array in macroblock format.

Referring now to FIG. 3A, there is illustrated a block diagram describing the frame buffer storing the picture 100 in accordance with an array format for the MPEG, DV25 and TM5 formats. The frame buffer 48 comprises two arrays 48Y, 48C of 16 byte/128 bit gwords 48Y(0), 48Y(1), 48Y(2), . . . , and 48C(0), 48C(1), 48C(2), . . . . The pixels luma pixels Y are stored in array 48Y. The chroma Cr and Cb pixels are stored in array 48C. The gwords 48Y(0), 48Y(1), . . . each store 16 horizontally adjacent luma pixels, $Y_{16i} \ldots Y_{16i+15}$ Each gword in array 48Y is associated with a gword in array 48C, wherein the associated gword in array 48C stores the chroma Cr and chroma Cb pixels co-located with the luma pixels $Y_{16i} \ldots Y_{16i+15}$.

Referring now to FIG. 3B, there is illustrated a block diagram describing the frame buffer 48 storing picture 100 in accordance with the packed YUV array format. The frame buffer 48 comprises 16 byte/128 bit gwords 48(0), 48(1), 48(2), . . . . The pixels $Y_0 \ldots Y_x$, $Cr_0 \ldots Cr_{(X-1)/2}$ in each row of the frame 100(0) . . . 100(N) are divided into units of four pixels $U_0 \ldots U_{(x-1)/2}$. Each unit $U_i$ comprises two luma pixels $Y_{2i}$ and $Y_{2i+1}$, and the chroma $Cr_i$ pixels and chroma $Cb_i$ pixels co-lcoated with luma pixels $Y_{2i}$. The units U of each row 100(0) . . . 100(N) are stored from left to right $U_0 \ldots U_{(x-1)/2}$ in consecutive four byte memory portions. The gwords 48(0), 48(1), . . . can store four units $U_{4i}$, $U_{4i+1}$, $U_{4i+2}$, $U_{4i+3}$, therein. The four pixels $Y_{2i}$, $Y_{2i+1}$, $Cr_i$, $Cb_i$ can be stored into four bytes in one of pixel orders, including, $Cb_i\ Y_{2i}\ Cr_i\ Y_{2i+1}$, $Cr_i\ Y_{2i}\ Cb_i\ Y_{2i+1}$, $Y_{2i}\ Cr_i\ Y_{2i+1} Cb_i$, and $Y_{2i}\ Cb_i\ Y_{2i+1} Cr_i$.

Referring now to FIG. 3C, there is illustrated a block diagram describing the frame buffer 48 storing picture 100 in accordance with the planar array format. The frame buffer 48 comprises three arrays 48Y, 48CR, 48CB of 16 byte/128 bit gwords 48Y(0), 48Y(1), 48Y(2), . . . , and 48C(0), 48C(1), 48C(2), . . . . The pixels luma pixels Y are stored in array 48Y. The chroma Cr are stored in array 48CR. The chroma Cb pixels are stored in array 48CB. The gwords 48Y(0), 48Y(1), . . . each store 16 horizontally adjacent luma pixels, $Y_{16i} \ldots Y_{16i+15}$. Each gword in array 48Y is associated with a gword half in array 48CR, and a gword half in array 48CB, wherein the associated gword half in array 48CR and array 48CB store the chroma Cr and chroma Cb pixels co-located with the luma pixels $Y_{16i} \ldots Y_{16i+}15$.

The pixels can either be written in the bigendian byte order, byte0, byte1, byte2, byte3 or the little endian byte order byte3, byte2, byte1, byte0.

Referring now to FIG. 4A, there is illustrated a block diagram of an exemplary gword 48(*i*) storing data in the big endian byte order. The gword 48(*i*) comprises 128 bits, $b_0 \ldots b_{127}$. In the big endian byte order, bytes are stored starting from bits $b_0 \ldots b_7$. The units $U_{4i}$, $U_{4i+1}$, $U_{4i+2}$, $U_{4i+3}$ are stored in bits $b_0 \ldots b_{31}$, $b_{32} \ldots b_{63}$, $b_{64} \ldots b_{95}$, $b_{96} \ldots b_{127}$, respectively. Additionally, the first, second, third, and fourth pixel of unit $U_{4i}$ are stored in bits $b_0 \ldots b_7$, $b_8 \ldots b_{15}$, $b_{16} \ldots b_{23}$, are $b_{24} \ldots b_{31}$, respectively. If the pixels of units $U_{4i}$, $U_{4i+1}$, $U_{4i+2}$, $U_{4i+3}$ are in the pixel order Cb, $Y_0$, Cr, $Y_1$, the chroma Cb pixels in units $U_{4i}$, $U_{4i+1}$, $U_{4i+2}$, $U_{4i+3}$ are stored in bits $b_0 \ldots b_7$, $b_{32} \ldots b_{39}$, $b_{64} \ldots b_{71}$, and $b_{96} \ldots b_{103}$, respectively. The first luma pixels (that is co-located with the chroma Cr and Cb pixels) $Y_0$ of units $U_{4i}$, $U_{4i+1}$, $U_{4i+2}$, $U_{4i+3}$ are stored in bits $b_8 \ldots b_{15}$, $b_{40} \ldots b_{47}$, $b_{72} \ldots b_{79}$, and $b_{104} \ldots b_{111}$, respectively. The chroma Cb pixels in units $U_{4i}$, $U_{4i+1}$, $U_{4i+2}$, $U_{4i+3}$ are stored in bits $b_{16} \ldots b_{23}$, $b_{48} \ldots b_{55}$, $b_{80} \ldots b_{87}$, and $b_{112} \ldots b_{119}$, respectively. The second luma pixels (that is co-located with the chroma Cr and Cb pixels) $Y_1$ of units $U_{4i}$, $U_{4i+1}$, $U_{4i+2}$, $U_{4i+3}$ are stored in bits $b_{24} \ldots b_{31}$, $b_{56} \ldots b_{63}$, $b_{88} \ldots b_{95}$, and $b_{120} \ldots b_{127}$, respectively.

Referring now to FIG. 4B, there is illustrated a block diagram of an exemplary gword 48(*i*) storing data in the little endian byte order. The gword 48(*i*) comprises 128 bits, $b_{127} \ldots b_0$. In the little endian byte order, bytes are stored starting from bits $b_{127} \ldots b_{120}$. The units $U_{4i}$, $U_{4i+1}$, $U_{4i+2}$, $U_{4i+3}$ are stored in bits $b_{127} \ldots b_{96}$, $b_{95} \ldots b_{64}$, $b_{63} \ldots b_{32}$, $b_{31} \ldots b_0$ respectively. Additionally, the first, second, third, and fourth pixel of unit $U_{4i}$ are stored in bits $b_{127} \ldots b_{120}$, $b_{119} \ldots b_{112}$, $b_{111} \ldots b_{104}$, are $b_{103} \ldots b_{96}$, respectively. If the pixels of units $U_{4i}$, $U_{4i+1}$, $U_{4i+2}$, $U_{4i+3}$ are in the pixel order Cb, $Y_0$, Cr, $Y_1$, the chroma Cb pixels in units $U_{4i}$, $U_{4i+1}$, $U_{4i+2}$, $U_{4i+3}$ are stored in bits $b_{127} \ldots b_{120}$, $b_{95} \ldots b_{68}$, $b_{88} \ldots b_{56}$, and $b_{31} \ldots b_{24}$, respectively. The first luma pixels (that is co-located with the chroma Cr and Cb pixels) $Y_0$ of units $U_{4i}$, $U_{4i+1}$, $U_{4i+2}$, $U_{4i+3}$ are stored in bits $b_{119} \ldots b_{112}$, $b_{87} \ldots b_{80}$, $b_{55} \ldots b_{48}$, and $b_{23} \ldots b_{16}$, respectively. The chroma Cb pixels in units $U_{4i}$, $U_{4i+1}$, $U_{4i+2}$, $U_{4i+3}$ are stored in bits $b_{111} \ldots b_{104}$, $b_{79} \ldots b_{72}$, $b_{47} \ldots b_{40}$, and $b_{15} \ldots b_8$, respectively. The second luma pixels (that is co-located with the chroma Cr and Cb pixels) $Y_1$ of units $U_{4i}$, $U_{4i+1}$, $U_{4i+2}$, $U_{4i+3}$ are stored in bits $b_{103} \ldots b_{96}$, $b_{71} \ldots b_{64}$, $b_{39} \ldots b_{32}$, and $b_7 \ldots b_0$, respectively.

From the foregoing, it can be seen that the 32-bits storing a unit U are different. Additionally, in big endian, the lowest order bits store the first pixel while in little endian, the highest order bits store the first pixel.

Referring now to FIG. 5, there is illustrated a block diagram of an exemplary gword 48(*i*) storing data in the big endian byte order. The gword 48(*i*) comprises 128 bits, $b_0 \ldots b_{127}$. In big endian order, bytes are stored starting from bits $b_0 \ldots b_7$. For pixels $Y_{16i} \ldots Y_{16i+15}$, the pixel $Y_{16i}$ is stored in bits $b_0 \ldots b_7$, The pixel $Y_{16i+1}$ is stored in bits $b_8 \ldots b_{15}$, the pixel $Y_{16i+2}$ is stored in bits $b_{16} \ldots b_{23}$, the pixel $Y_{16i+3}$ is stored in bits $b_{24} \ldots b_{31}$, and the pixel $Y_{16i+15}$ is stored in bits $b_{120} \ldots b_{127}$. For pixels $Cr/Cb_{8i} \ldots Cr/Cb_{8i+7}$, the pixel $Cr_{8i}$ is stored in bits $b_0 \ldots b_7$, pixel $Cb_{8i}$ is stored in bits $b_8 \ldots b_{15}$, pixel $Cr_{8i+1}$ is stored in bits $b_{16} \ldots b_{23}$, pixel $Cb_{8i+1}$ is stored in bits $b_{24} \ldots b_{31}$, pixel $Cr_{8i+7}$ is stored in bits $b_{112} \ldots b_{119}$, pixel $Cb_{8i+7}$ is stored in bits $b_{120} \ldots b_{127}$.

From the foregoing, it can be seen that the bits storing pixels are different. In the big endian byte order, the lowest order bits store the first pixel while in little endian byte order, the highest order bits store the first pixel.

The display device is usually separate from the decoder system. The display device displays the frames with highly synchronized timing. Each row 100(0) . . . 100(N) is displayed at a particular time interval. The display engine 50 provides the pixels to the display device for display, via the video encoder 55. The display device and the display engine 50 are synchronized by means of a vertical synchronization pulses and horizontal synchronization pulses. When the display device begins displaying a new frame 100 or field, the display device transmits a vertical synchronization pulse. Each time the display device begins displaying a new line 100(*x*), the display device sends a horizontal synchronization pulse. The display engine 50 uses the horizontal and vertical synchronization pulses to provide a bitstream comprising the pixels at a time related to the time for display.

The display engine 50 generates the bitstream from the decoded frames stored in the frame buffers 48. To generate the bitstream of the pixels for display on the display device, the display engine 50 fetches the pixels from the frame buffer 48. However, the decoded pictures may be progressive while the display device is interlaced. Additionally, the decoded picture may have chroma pixels in different positions from the display format. Additionally, the pixels of the decoded frame may be stored in a variety of different ways. For example, the chroma pixels can either be stored separately or with the luma pixels.

Where the decoded frame has a different chroma format from the display format, the chroma pixels for the chroma pixel positions in the display format are interpolated from the chroma format of the decoded frame.

Referring now to FIG. 6, there is illustrated a block diagram of the display engine 50 in accordance with an embodiment of the present invention. The display engine 50 includes a scalar 705, a compositor 710, a feeder 715, and a deinterlacing filter 720. The feeder 715 provides a bitstream of the pixels in the order the pixels are displayed for the display device. The bitstream comprises chroma pixels in the chroma pixel positions of the display format.

Referring now to FIG. 7, there is illustrated a block diagram describing an exemplary feeder 715 in accordance with an embodiment of the present invention. The feeder 715 provides a bitstream comprising pixels for display on the display device. The bitstream provides the pixels for display on the display device at a time related to the time the pixels are to be displayed by the display device. Additionally, the bitstream comprises chroma pixels in the chroma pixel positions in accordance with the display format. After each horizontal synchronization pulse, a row 100(*x*) is presented to the display device 65 for display.

After each vertical synchronization pulse, the host processor 90 programs the feeder 715 with the addresses of the frame buffer memory locations storing the first luma pixels, the first chroma pixel(s) for display (i.e., the left most pixels in row 100(0)), and the format of the decoded frame.

The foregoing parameters are provided to the feeder 715 via the RBUS interface 805. After providing the parameters to the RBUS interface 805, the host 90 sets a start parameter in the RBUS interface 805.

The RBUS interface 805 provides the initial starting luma and chroma addresses to the BRM 815. When the BRM 815 receives the starting luma and chroma addresses, the start parameter in the RBUS interface 805 is deasserted. The BRM 815 issues the commands for fetching the luma and chroma pixels in the first line of the frame/field. The IDWU 820 effectuates the commands.

The BRM 815 includes a command state machine 815*a* and horizontal address computation logic 815*b*. The command state machine 815*a* can issue commands to the IDWU 820 causing the feeder 715 to fetch pixels from the frame buffer at a memory address provided by the command state machine 815*a*. The command state machine initially commands the IDWU 820 to fetch the pixels starting at the starting luma and chroma addresses. The horizontal computation logic 815*b* maintains the address of the frame buffer 48 location storing the next pixels in the display order.

The IDWU 820 writes the fetched pixels to a double buffer 840 until the double buffer 840 is full. After the double buffer 840 is full, the double buffer machine detects when half of the data in the double buffer 840 is consumed. Responsive thereto, the command state machine 815*a* commands the IDWU 820 to fetch the next pixels in the display order, starting at the address calculated by the horizontal address computation logic 815*b*, until the double buffer 840 is full. The foregoing continues for each pixel in the first line 100(0).

A line address computer 810 calculates the address of the memory locations storing the starting pixels of the next line, e.g., line 100(1) if a progressive display or line 100(2) if an interlaced display. The BRM 815 causes the IDWU 820 to start fetching pixels form the provided starting address. For each horizontal synchronization pulse, the line address computer 810 provides the address of the memory locations storing the first pixel (leftmost) of a row of luma pixels. The line address computer 810 provides the address storing the first pixel of consecutive rows of luma pixels 100(0), 100(1), . . . , 100(N) if the display is progressive. The line address computer 810 provides the address storing the first pixel of alternating rows of luma pixels 100(0), 100(2), . . . , 100(N-1), 100(1), 100(3) . . . 100(N) if the display device 65 is interlaced. The line address computer 810 is described in more detail in U.S. patent application Ser. No. 10/703,332, filed Nov. 7, 2003, by Hatti, et. al. (Attorney Docket No. 15139US02), which is incorporated herein by reference.

Additionally, as noted above, the feeder 715 interpolates chroma pixels for the chroma pixel positions in the display picture from the pixels in the decoded picture.

At each horizontal synchronization pulse, the line address computer 810 provides interpolation weights, $WCb_T$, $WCb_B$, $WCr_T$, and $WCr_B$ for interpolation to a chroma filter. The interpolation weights depend on the decoded frame format, the display format, and the specific row with the chroma pixel positions.

A pixel feeder 835 comprises an endian swizzle & pixel select logic 835*a*, a chroma filter data path 835*b*, a chroma line buffer 835*c*, an output data path 835*d*, fixed color generation logic 835*e*, and a double buffer read state machine 835*f*. The double buffer state machine 835*f* performs various duties that manage the pixel feeder 835. The duties include maintaining the double-buffer 840 status, reading pixels from the double buffer 840, sequencing the chroma filter datapath 835*b*, and loading pixels onto the FIFO 830.

The pixels are fetched from the frame buffer and stored in the double buffer 840 in the same byte order, pixel order and array format that the pixels were stored in the frame buffer 48. The double buffer read state machine 835*f* creates a rasterized data stream from the luma pixel data as well as associated chroma pixel bitstream(s). The luma pixel data stream and the chroma pixel bitstream(s) are synchronized with respect to each other, such that the luma pixels in the stream at a particular time and the chroma pixels in the stream(s) at a particular time are either co-located, or the pixels for interpolating the chroma pixels at chroma pixel positions co-located with the luma pixels.

Figure 8:
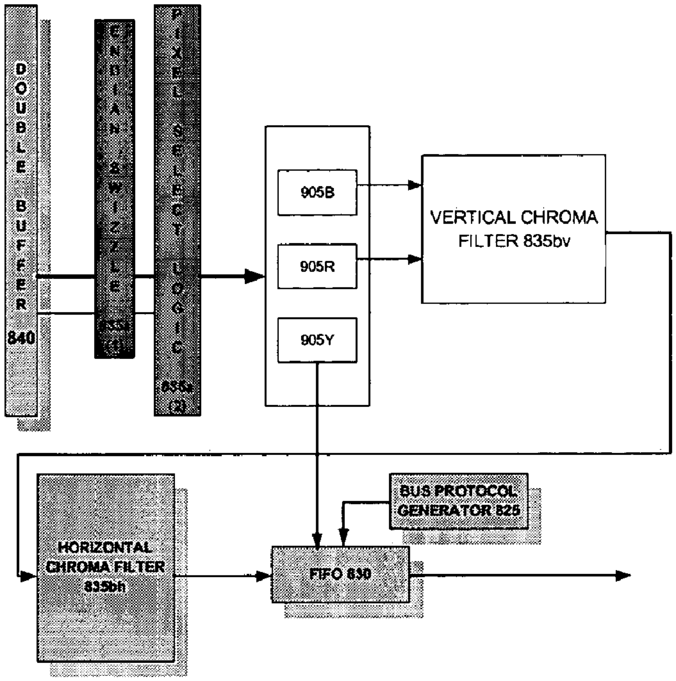
FIG. 8 is a block diagram of the pixel feeder in accordance with an embodiment of the present invention.

Referring now to FIG. 8, there is illustrated a block diagram of the pixel feeder 835 in accordance with an embodiment of the present invention. The pixel feeder 835 includes a data path comprising the endian swizzle 835*a*(1), pixel select logic 835*a*(2), a 32-bit luma pixel register 905Y, a 16-bit chroma Cr pixel register 905R, and a 16-bit chroma Cb pixel register 905B.

The chroma Cr pixel register 905R and the chroma Cb pixel register 905B provide chroma Cr and chroma Cb pixels to the vertical chroma filter 835*bv*. The vertical chroma filter 835*by* interpolates chroma pixels for the display format in the vertical direction. The output of the vertical chroma filter 835*bv* is provided to the horizontal chroma filter **835*bh*. The horizontal chroma filter 835*bh*** interpolates chroma pixels for the display format in the horizontal direction.

A FIFO 830 receives the luma bitstream from the luma pixel register 905Y and a bitstream of interpolated chroma pixels. The FIFO 830 also receives signals from a bus protocol generator 825 to prepare the luma bitstream and interpolated chroma bitstream for transmission over a bus.

The double buffer state machine **835*f* creates the bitstream of chroma and luma pixels by fetching chroma and luma pixels from the double buffer 840 at regular time intervals for the pixel registers 905. As noted above, the pixels are fetched from the frame buffer and stored in the double buffer 840 in the same byte order, pixel order and array format. The double buffer state machine 835*f* fetches four pixels per double buffer 840 access. Because the pixels are stored in the double buffer 840 in the same byte order, pixel order and array format as stored in the frame buffer 48**, the four pixels accessed during each access can include different types of pixels.

In the case of the packed YUV format, the pixel registers 905 are filled every two double buffer 840 accesses. One unit U is accessed during each access. Each unit U comprises two luma Y pixels, a chroma pixel Cr, and a chroma pixel Cb. The luma pixel register 905Y receives the four luma pixels Y, the chroma Cr pixel register 905R receives the two chroma pixels Cr, and the chroma Cb pixel register 905B receives the two chroma pixels Cb.

In the case of the MPEG/DV-25/TM5 formats, four luma pixels Y are fetched in one double buffer 840 access and provided to the luma pixel register 905Y. In the next double buffer 840 access, the two chroma Cr and the two chroma Cb pixels associated with the four luma pixels are fetched and provided to the chroma Cr pixel register 905R and chroma Cb pixel register 905B, respectively.

Additionally, either the big endian or little endian byte order can be used for storing the pixels in the double buffer 840. Therefore, the position of each particular pixel within the four bytes depends on whether the big endian or little endian byte order is used. For consistent handling, either the big endian byte order or the little endian order is chosen. Bytes of pixel data in the different or opposite byte order chosen can be reordered. The endian swizzle **835*a*(1) reverses the ordering of the pixels from the double buffer 840** from either little endian to big endian, or big endian to little endian, when the byte order of the pixels is different or opposite the byte order chosen.

Because each double buffer 840 access can include a variety of different pixels therein, the pixel select logic **835*a*(2) directs the pixels to the appropriate pixel registers 905**.

Figure 9:
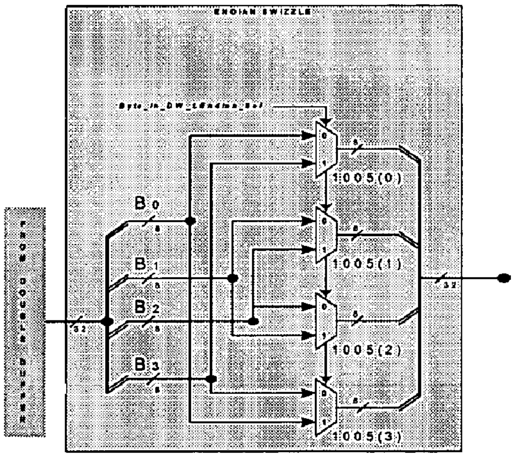
FIG. 9 is a block diagram of an endian, swizzle in accordance with an embodiment of the present invention.

Referring now to FIG. 9, there is illustrated a block diagram of the endian swizzle **835*a*(1) in accordance with an embodiment of the present invention. The endian swizzle 835*a*(1) receives the four pixels/32-bit access from the double buffer 840. The 32-bit access is demultiplexed into four bytes $B_0$, $B_1$, $B_2$, and $B_3$, each byte corresponding to a pixel. The endian swizzle 835*a*(1) includes four multiplexers 1005(0), 1005(1), 1005(2), and 1005(3)**.

If a different or opposite byte ordering is used for the pixels, then the byte order chosen, $B_0$ in the original byte order corresponds to $B_3$ of the chosen byte order. $B_1$ in the little endian order corresponds to $B_2$ of the chosen byte order. $B_2$ in the little endian order corresponds to $B_1$ of the chosen byte order. $B_3$ in the little endian order corresponds to $B_0$ of the chosen byte order.

Accordingly, multiplexers 1005(0) and 1005(3) receive bytes $B_0$ and $B_3$. Multiplexers 1005(1) and 1005(2) receive bytes $B_1$ and $B_2$. If the original byte order is different or opposite the chosen byte order, bytes $B_0$ and $B_3$ are swapped and bytes $B_1$ and $B_2$ are swapped. Multiplexer 1005(0) selects byte $B_3$, multiplexer 1005(1) selects byte $B_2$, multiplexer 1005(2) selects byte $B_1$, and multiplexer 1005(3) selects byte $B_0$. The outputs of the multiplexers 1005 are multiplexed to result in the 32-bit access converted to the big-endian byte order, e.g., $B_3$, $B_2$, $B_1$, $B_0$. If the original byte order is the same as the chosen byte order, the byte ordering is maintained. Multiplexer 1005(3) selects byte $B_3$, multiplexer 1005(2) selects byte $B_2$, multiplexer 1005(1) selects byte $B_1$, and multiplexer 1005(0) selects byte $B_0$. The outputs of the multiplexers 1005 are multiplexed to result in the original 32-bit access, e.g., $B_0$, $B_1$, $B_2$, $B_3$. The multiplexers 1005 are controlled by a signal Byte_In_DW_endian_Sel indicating whether a different or opposite byte order is originally used (1 indicates used, 0 indicates not used, for example) provided by the double buffer read state machine **835*f*** to effectuate the foregoing.

Figure 10:
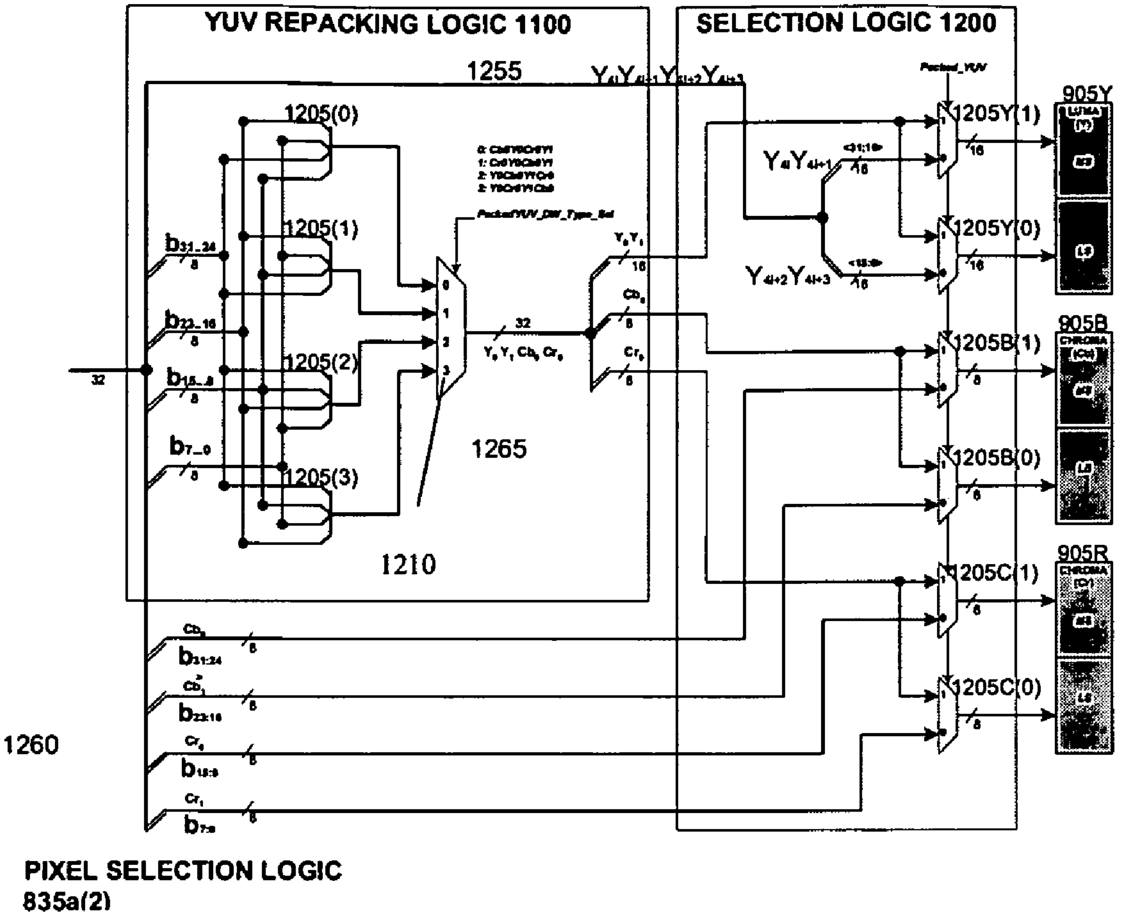
FIG. 10 is a block diagram of pixel select logic in accordance with an embodiment of the present invention.

Referring now to FIG. 10, there is illustrated a block diagram describing an exemplary pixel select logic **835*a*(2) in accordance with an embodiment of the present invention. The pixel select logic 835*a*(2) comprises YUV reordering logic 1100 and selection logic 1200**.

The pixel select logic **835*a*(2) receives the output $b_{31} \ldots b_0$ from the endian swizzle 835*a*(1). Three data paths provide the output $b_{31} \ldots b_0$ from the endian swizzle 835*a*(1) to the selection logic—the luma pixel path 1255, the chroma pixel path 1260, and the packed YUV path 1265. The packed YUV path includes a YUV repacking logic 1100**.

As noted above, where the frame 100 is stored in the packed YUV array format, the double buffer read state machine **835*f*** accesses one unit Upper access. The unit U comprises two luma pixels, a chroma pixel Cr, and a chroma pixel Cb. However, the pixel order within the unit U can vary.

Accordingly, the YUV reordering logic 1100 demultiplexes $b_{31} \ldots b_0$ into four bytes, $b_{31} \ldots b_{24}$, $b_{23} \ldots b_{16}$, $b_{15} \ldots b_8$, and $b_7 \ldots b_0$. Each of the four bytes, $b_{31} \ldots b_{24}$, $b_{23} \ldots b_{16}$, $b_{15} \ldots b_8$, and $b_7 \ldots b_0$, are provided to multiplexers 1205(0), 1205(1), 1205(2), 1205(3). Each multiplexer 1205 is configured to reorder pixels from a particular packed YUV format pixel order, to $Y_{2i}$, $Y_{2i+1}$, $Cb_i$, $Cr_i$.

For example, multiplexer 1205(0) changes the packed YUV pixel order $Cb_i$, $Y_{2i}$, $Cr_i$, $Y_{2i+1}$ to $Y_{2i}$, $Y_{2i+1}$, $Cb_i$, $Cr_i$. Accordingly, the multiplexer 1205(0) reorders the bytes $b_{31} \ldots b_{24}$, $b_{23} \ldots b_{16}$, $b_{15} \ldots b_8$, and $b_7 \ldots b_0$, as $b_{23} \ldots b_{16}$, $b_7 \ldots b_0$, $b_{31} \ldots b_{24}$, $b_{15} \ldots b_8$.

Multiplexer 1205(1) changes the packed YUV pixel order format $Cr_i$, $Y_{2i}$, $Cb_i$, $Y_{2i+1}$ to $Y_{2i}$, $Y_{2i+1}$, $Cb_i$, $Cr_i$. Accordingly, the multiplexer 1205(1) reorders the bytes $b_{31} \ldots b_{24}$, $b_{23} \ldots b_{16}$, $b_{15} \ldots b_8$, and $b_7 \ldots b_0$, as $b_{23} \ldots b_{16}$, $b_7 \ldots b_0$, $b_{15} \ldots b_8$, $b_{31} \ldots b_{24}$.

Multiplexer 1205(2) changes the packed YUV pixel order $Y_{2i}$, $Cb_i$, $Y_{2i+1}$, $Cr_i$ to $Y_{2i}$, $Y_{2i+1}$, $Cb_i$, $Cr_i$. Accordingly, the multiplexer 1205(2) reorders the bytes $b_{31} \ldots b_{24}$, $b_{23} \ldots b_{16}$, $b_{15} \ldots b_8$, and $b_7 \ldots b_0$, as $b_{31} \ldots b_{24}$, $b_{15} \ldots b_8$, $b_{23} \ldots b_{16}$, $b_7 \ldots b_0$.

Multiplexer 1205(3) changes the packed YUV pixel order $Y_{2i}$, $Cr_i$, $Y_{2i+1}$, $Cb_i$ to $Y_{2i}$, $Y_{2i+1}$, $Cb_i$, $Cr_i$. Accordingly, the multiplexer 1205(3) reorders the bytes $b_{31} \ldots b_{24}$, $b_{23} \ldots b_{16}$, $b_{15} \ldots b_8$, and $b_7 \ldots b_0$, as $b_{31} \ldots b_{24}$, $b_{15} \ldots b_8$, $b_7 \ldots b_0$, $b_{23} \ldots b_{16}$.

The another multiplexer 1210 receives the outputs of the multiplexers 1205 and selects the multiplexer 1205 corresponding to the packed YUV pixel order of the fetched pixels. The double buffer read engine 835*f* provides a signal, PackedYUV _DW_Type_Sel indicating the packed YUV format pixel order of the pixels in the frame buffer/double buffer 840 (0=>$Cb_i$, $Y_{2i}$, $Cr_i$, $Y_{2i+1}$, 1=>$Cr_i$, $Y_{2i}$, $Cb_i$, $Y_{2i+1}$, 2=>$Y_{2i}$, $Cb_i$, . . . $Y_{2i+1}$, $Cr_i$, 3=>$Y_{2i}$, $Cr_i$, $Y_{2i+1}$, $Cb_i$) to the multiplexer 1210. The signal PackedYUV_DW_Type_Sel, causes the multiplexer 1205 to select the multiplexer 1205 associated with the indicated packed YUV pixel order. The output of multiplexer 1210 is then demultiplexed to separate the two luma pixels $Y_{2i}$, $Y_{2i+1}$, the chroma pixel $Cb_i$ and the chroma pixel $Cr_i$.

The selection logic 1200 receives pixels via the luma path 1255, the chroma path 1260, and the packed YUV path 1265. The signal on the luma path 1255 is demultiplexed into two 16-bit components, $b_{31}$ . . . $b_{16}$, and $b_{15}$ . . . $b_0$. The signal on the chroma path 1260 is demultiplexed into four 8-bit components, $b_{31}$ . . . $b_{24}$, $b_{23}$ . . . $b_{16}$, $b_{15}$ . . . $b_8$, and $b_7$ . . . $b_0$. The selection logic comprises six multiplexers 1205Y(1), 1205Y(0), 1205B(1), 1205B(0), 1205R(1), and 1205(0). The luma pixel register 905Y receives a 16-bit output $b_{31}$ . . . $b_{16}$ output from multiplexer 1205Y(1) and a 16-bit output from multiplexer 1205Y(0) $b_{15}$ . . . $b_0$. The chroma Cb pixel register 905B receives an 8-bit output $b_{15}$ . . . $b_8$ from multiplexer 1205B(1) and an 8-bit output from multiplexer 1205B(0). The chroma Cb pixel register 905R receives an 8-bit output $b_{15}$ . . . $b_8$ from multiplexer 1205R(1) and an 8-bit output from multiplexer 1205R(0).

The multiplexer 1205Y(1) receives the luma pixels $Y_{2i}$, $Y_{2i+1}$ from the packed Y V path 1260 and bits $b_{31}$ . . . $b_{16}$ from the luma path 1255. Multiplexer 1205Y(0) receives the luma pixels $Y_{2i}$, $Y_{2i+1}$ from the packed YUV path 1260 and bits $b_{15}$ . . . $b_0$ from the luma path 1255.

The multiplexer 1205B(1) receives a chroma pixel $Cb_i$ from the packed YUV path 1260 and bits $b_{31}$ . . . $b_{24}$ from the chroma path 1265. The multiplexer 1205B(0) receives a chroma pixel $Cb_i$ from the packed YUV path 1260 and bits $b_{23}$ . . . $b_{16}$ from the chroma path 1265.

The multiplexer 1205R(1) receives a chroma pixel $Cr_i$ from the packed YUV path 1260 and bits $b_{15}$ . . . $b_8$ from the chroma path 1265. The multiplexer 1205B(0) receives a chroma pixel $Cb_i$ from the packed YUV path 1260 and bits $b_7$ . . . $b_0$ from the chroma path 1265.

Each of the multiplexers 1205 are controlled by a signal Packed_YUV provided by the double buffer read state machine 835*f*. When the picture 100 is in MPEG/DV-25/TM5 format, the luma path 1255 and chroma path 1265 carry four luma pixels $Y_{4i}$, $Y_{4i+1}$, $Y_{4i+2}$, $Y_{4i+3}$ during one double buffer 840 access, followed by two chroma pixels $Cb_{2i}$, $Cb_{2i+1}$, and two chroma pixels $Cr_{2i}$, $Cr_{2i+1}$, during the next double buffer 840 access, in alternating fashion. The multiplexers 1205Y(1) and 1205Y(0) select the respective portions of the luma path 1255. The multiplexers 1205B(1) 1205B(0), 1205R(1), and 1205R(0) select the respective portions of the chroma path 1265.

When the picture 100 is in the packed YUV array format, the packed YUV path 1260 carries two luma pixels $Y_{2i}$, $Y_{2i+1}$, and chroma pixels $Cb_i$, and $Cr_i$ during each access. Each of the multiplexers 1205 selects the respective portions of the packed YUV path 1260.

The pixel registers 905 load the outputs from the multiplexers 1205 connected thereto, responsive to a control signals 910 provided by the double buffer read state machine 835*f*. As noted above, when the frame 100 is stored in the array format for MPEG/DV-25/TM5, double buffer 840 accesses provide either four luma pixels or two chroma Cr and two chroma Cb pixels, and in alternating fashion.

Accordingly, when the double buffer 840 access provides four luma pixels, the control signals 910Y(1), 910Y(0) controlling the luma pixel register 905 is asserted, causing the luma pixel register 905 to load the outputs of multiplexers 905Y(1), and 905Y(0).

When the double buffer 840 access provides chroma pixels, the control signals 910B(1), 910B(0), 910R(1), and 910R(0) controlling the chroma Cr pixel register 905R and the chroma Cb pixel register 905B are asserted, causing the chroma Cr pixel register 905R and chroma Cb pixel register 905B to load the outputs of multiplexers 905B(1), 905B(0) and multiplexers 905R(1), 905R(0). The foregoing results in pixel registers 905Y, 905B, and 905R to store four luma pixels, two chroma Cb pixels, and two chroma Cr pixels, respectively, after every two double buffer 840 accesses, wherein the chroma pixels are associated with the luma pixels. For example, the chroma pixels can be co-located with the luma pixels in the picture 100.

When the picture 100 is stored in the Packed YUV array format, double buffer 840 accesses provides two luma pixels, a chroma Cr and chroma Cb pixel. The control signals 910Y(1), 910B(1), and 910R(1) control a half of registers 905Y, 905B, and 905R storing the most significant bytes. The control signals 910Y(0), 910B(0), and 910R(0) control a half of registers 905Y, 905B, and 905R storing the least significant bytes. The control signals 910Y(1), 910B(1), and 910R(1) are asserted in alternating fashion with control signals 910Y(0), 910B(0), and 910R(0) causing the pixel registers 905Y, 905B, and 905R to store four luma pixels, two chroma Cb pixels, and two chroma Cr pixels after every two double buffer 840 accesses, wherein the chroma pixels are associated with the luma pixels. For example, the chroma pixels are co-located with the luma pixels in the picture 100.

One embodiment of the present invention may be implemented as a board level product, as a single chip, application specific integrated circuit (ASIC), or with varying levels integrated on a single chip with other portions of the system as separate components.

The degree of integration of the system will primarily be determined by speed and cost considerations. Because of the sophisticated nature of modern processors, it is possible to utilize a commercially available processor, which may be implemented external to an ASIC implementation of the present system.

Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope.

Therefore, it is intended that the invention not be limited to the particular embodiment(s) disclosed, but that the invention will include all embodiments falling within the scope of the appended claims.

The invention claimed is:

1. A method for displaying frames, said method comprising:

fetching a portion of a frame stored in a frame buffer;

storing the portion of the frame in another buffer;

fetching a plurality of pixels from the portion of the frame;

storing luma pixels in a luma pixel register, if the plurality of pixels comprise luma pixels;

storing chroma pixels in a chroma pixel register, if the plurality of pixels comprise chroma pixels;

wherein storing the chroma pixels in the chroma pixel register further comprises:

receiving the plurality of pixels over a first path;

receiving a portion of the plurality of pixels over a second path;

selecting the plurality of pixels from the first path, if all of the plurality of pixels are chroma pixels;

selecting the portion of the plurality of pixels from the second path, if a portion of the plurality of pixels are chroma pixels and another portion of the plurality of pixels are luma pixels;

storing at least one of the plurality of pixels in a chroma red pixel register, if the plurality of pixels are selected;

storing at least one of the plurality of pixels in a chroma blue pixel register, if the plurality of pixels are selected;

storing at least one of the pixels from the portion of the plurality of pixels from the second path in the chroma red pixel register, if the portion of the plurality of pixels are selected; and storing at least one of the pixels from the portion of the plurality of pixels from the second path in the chroma blue pixel register, if the portion of the plurality of pixels are selected.

2. The method of claim 1, further comprising:

decoding the frame; and storing the frame in the frame buffer.

3. The method of claim 1, wherein the another buffer forms a portion of a display engine.

4. The method of claim 3, wherein the another buffer forms a portion of a feeder.

5. The method of claim 1, wherein storing the luma pixels in the luma pixel register further comprises:

receiving the plurality of pixels; and providing the luma pixels to the luma pixel register, if the plurality of pixels comprise luma pixels.

6. The method of claim 1, wherein storing the luma pixels in the luma pixel register further comprises:

receiving the plurality of pixels over a first path;

receiving a portion of the plurality of pixels over a second path;

selecting the plurality of pixels from the first path, if all of the plurality of pixels are luma pixels; and selecting the portion of the plurality of pixels from the second path, if a portion of the plurality of pixels are luma pixels and another portion of the plurality of pixels are chroma pixels.

7. The method of claim 1, wherein storing chroma pixels in the chroma pixel register further comprises:

receiving the plurality of pixels; and providing the chroma pixels to the chroma pixel register, if the plurality of pixels comprise chroma pixels.

8. The method of claim 1, wherein storing chroma pixels in the chroma pixel register further comprises:

receiving the plurality of pixels;

providing chroma red pixels to a chroma red pixel register, if the plurality of pixels comprise chroma red pixels; and providing chroma blue pixels to a chroma blue pixel register, if the plurality of pixels comprise chroma blue pixels.

9. A system for displaying frames, said system comprising:

a first circuit for fetching a portion of a frame stored in a frame buffer;

a buffer for storing the portion of the frame;

a state machine for fetching a plurality of pixels from the portion of the frame;

a luma pixel register for storing luma pixels, if the plurality of pixels comprise luma pixels;

a chroma pixel register for storing chroma pixels, if the plurality of pixels comprise chroma pixels;

a first multiplexer for receiving a first portion of the plurality of pixels over a first path, and for receiving a second portion of the plurality of pixels over a second path, the first multiplexer associated with a first portion of the luma pixel register;

a second multiplexer for receiving a remainder of the plurality of pixels from the first portion of the plurality of pixels over a first path, and for receiving the second portion of the plurality of pixels, the second multiplexer associated with a second portion of the luma pixel register; and the first multiplexer provides the portion of the plurality of pixels to the first portion of the luma pixel registers and the second multiplexer provides the remainder of the plurality of the pixels to the second portion of the luma pixel register if the portion of the plurality of pixels and the remainder of the plurality of pixels comprise luma pixels;

the state machine selects one of the first multiplexer and the second multiplexer, the selected one of the multiplexers providing the second portion of the pixels to the associated portion of the luma pixel register, if the plurality of pixels comprise luma and chroma pixels.

10. The system of claim 9, further comprising:

a video decoder for decoding the frame; and the frame buffer for storing the frame.

11. The system of claim 9, wherein the buffer forms a portion of a display engine.

12. The system of claim 11, wherein the buffer forms a portion of a feeder.

13. A system for displaying frames, said system comprising:

a first circuit for fetching a portion of a frame stored in a frame buffer;

a buffer for storing the portion of the frame;

a state machine for fetching a plurality of pixels from the portion of the frame;

a luma pixel register for storing luma pixels, if the plurality of pixels comprise luma pixels;

a chroma pixel register for storing chroma pixels, if the plurality of pixels comprise chroma pixels;

a first multiplexer for receiving a first portion of the plurality of pixels over a first path, and for receiving a second portion of the plurality of pixels over a second path, the first multiplexer associated with a first portion of the chroma pixel register;

a second multiplexer for receiving a remainder of the plurality of pixels from the first portion of the plurality of pixels over a first path, and for receiving the second portion of the plurality of pixels, the second multiplexer associated with a second portion of the chroma pixel register; and the first multiplexer provides the portion of the plurality of pixels to the first portion of the luma pixel registers and the second multiplexer provides the remainder of the plurality of the pixels to the second portion of the luma pixel register if the portion of the plurality of pixels and the remainder of the plurality of pixels comprise chroma pixels;

the state machine selects one of the first multiplexer and the second multiplexer, the selected one of the multiplexers providing the second portion of the plurality of pixels to the associated portion of the luma pixel register, if the plurality of pixels comprise luma and chroma pixels.

14. The system of claim 13, further comprising:

a video decoder for decoding the frame; and the frame buffer for storing the frame.

15. The system of claim 13, wherein the buffer forms a portion of a display engine.

16. The system of claim 15, wherein the buffer forms a portion of a feeder.

* * * * *